US006141993A

United States Patent [19]
Whitbeck

[11] Patent Number: 6,141,993
[45] Date of Patent: Nov. 7, 2000

[54] NETTING FOR LAWNGRASS TRANSPLANTATION AND METHOD OF MANUFACTURING THE NETTING

[75] Inventor: Frank B. Whitbeck, Little Rock, Ark.

[73] Assignees: Winrock Grass Farm, Inc., Little Rock, Ark.; Zoysian Japan Co., Ltd., Hiroshima, Japan

[21] Appl. No.: 09/134,415

[22] Filed: Aug. 14, 1998

[51] Int. Cl.[7] .................................................. D04B 21/20
[52] U.S. Cl. ................................ 66/195; 66/170; 66/202; 66/192
[58] Field of Search .............................. 66/83, 84 R, 203, 66/169 R, 170, 192, 193, 195, 202; 47/56, 74

[56] References Cited

U.S. PATENT DOCUMENTS

| | | | |
|---|---|---|---|
| 3,848,359 | 11/1974 | Seith et al. ................................ | 47/56 |
| 4,067,210 | 1/1978 | Arons et al. ............................... | 66/202 |
| 4,638,648 | 1/1987 | Gajjar ....................................... | 66/193 |
| 4,982,526 | 1/1991 | Miyachi .................................... | 47/56 |
| 5,033,231 | 7/1991 | Sakate et al. .............................. | 47/56 |
| 5,205,068 | 4/1993 | Solomou ................................... | 47/56 |
| 5,226,255 | 7/1993 | Robertson ................................. | 47/56 |
| 5,307,588 | 5/1994 | Ullmann .................................... | 47/56 |
| 5,344,470 | 9/1994 | Molnar et al. ............................. | 47/58 |

OTHER PUBLICATIONS

Turfgrass Research Field Day, National Turfgrass Evaluation Program; Aug. 3, 1995; NTEP No. 95–13.

Y. Miyachi et al., "A Newly Developed Zoysain–Net Planting System for Quick Establishment of Zoysiagrass", International Turfgrass Society Research Journal, Chapter 126 (1993).

F. Miyachi, "Turfgrass Production in Japan", Turf News, pp. 8–10 and 26, (Nov./Dec. 1994).

*Primary Examiner*—Danny Worrell
*Attorney, Agent, or Firm*—Oliff & Berridge, PLC

[57] ABSTRACT

A net for lawngrass transplantation that maintains its strength while minimizing the amount of material required for its manufacture. The net is a four bar fabric having bar movements of (1) 0-8, 8-0, etc.; (2) 0-0, 24-24, etc.; (3) 32-32, 24-24, 32-32, 24-24, 32-32, 24-24, 32-32, 0-0, 8-8, 0-0, 8-8, 0-0, 8-8, 0-0; and (4) 0-0-0, 8-8, 0-0, 8-8, 0-0, 8-8, 0-0, 32-32, 24-24, 32-32, 24-24, 32-32, 24-24, 32-32, 24-24 and 32-32.

4 Claims, 7 Drawing Sheets ly, the present invention is a netting for
NETTING FOR LAWNGRASS TRANSPLANTATION AND METHOD OF MANUFACTURING THE NETTING

BACKGROUND OF THE INVENTION

1. Field of Invention

The present invention is an improved netting for lawngrass transplantation and the method of making the netting. More particularly, the present invention is a netting for lawngrass transplantation that has a knit structure that maintains high strength characteristics but reduces the amount of material used in the netting, and the method of making this netting.

2. Description of Related Art

Vegetative lawngrass typically is propagated by transplantation of plant stolons and rhysomes and not by seed. This vegetative lawngrass includes Bermudagrasses, Zoysiagrasses (Zoysia Willd) such as Japanese lawngrass (Zoysia japonica Steud) and Mascarenegrass (Zoysia tenuifolia Willd). This vegetative lawngrass is commonly propagated to form golf lawns, home lawns, parks, gardens and other expansive grass areas.

This transplantation often occurs as follows. The lawngrass is cut in a source field into sprigs of a desired size, transported, laid on the area to be propagated, then spread as desired and watered. Other times, vegetative lawngrass sod is cut into plugs and planted on 6" to 12" centers. However, it is desirable to space the plugs at the minimum acceptable intervals to minimize the number of sod plugs and thus reduce the cost of the propagation. The spacing of the plugs results in the transplanted lawngrass being irregular until the grass grows in the gaps at the same maturity and density as the transplanted plugs.

Another method of transplanting lawngrass is solid sodding. Lawngrass sod is cut into pieces of sod to be laid side by side or is cut into a continuous strip and rolled into a big roll. This is known as "big roll" sod. Big roll sod requires a backing to maintain the integrity of the sod while rolling, transporting and installing the lawngrass. The backing should decay to avoid interference with the use of the lawngrass. However, conventional backing is plastic and not biodegradable.

Yet another method for transplanting such lawngrass is in a mat for use in the method disclosed in U.S. Pat. No. 4,982,526 to Yoshifumi Miyachi, which is incorporated herein by reference. U.S. Pat. No. 4,982,526 discloses a lawngrass mat that can be readily transplanted for quick growth and results in a propagation of uniform density grass. The method of transplantation provides for first cutting sprigs from the source field and fraying out lawngrass sprigs into a mat. The lawngrass mat is formed by placing the lawngrass sprigs on a base net and covering the lawngrass sprigs with a cover. The base net and cover net consists of material capable of decaying and decomposing, such as a cotton fiber. Conventional netting cannot be employed in this method because it has low linear and lateral strength and tends to deform when laid flat or rolled out. Also, the netting used in this method must decay relatively rapidly to avoid interfering with the use of the lawn.

SUMMARY OF THE INVENTION

The present invention is a biodegradable lawngrass netting for use in a lawngrass transplantation mat and/or as a backing for big roll sod, and the method of making the biodegradable netting. The biodegradable netting has a high linear and lateral strength and keeps its shape when laid flat or rolled out. Additionally, the present netting uses a reduced amount of natural fiber material and thereby lowers the cost of manufacture and also decreases the amount of time required for the netting to decompose.

The netting can be used in lawngrass transplantation matting manufactured by cutting lawngrass grown on a lawngrass source field into sprigs as desired, dispersing the sprigs on the biodegradable netting (which functions as a base net), spraying chemicals such as a rooting accelerator, a vegetation accelerator, an anti-wilting agent, a fungicide, an insecticide and a fertilizer over the lawngrass sprigs and the netting and placing a cover netting over the lawngrass sprigs and base net to sandwich the lawngrass sprigs between the base net and the cover net. The cover can be of the same netting as the base net, if desired.

The lawngrass mat may then be rolled into a roll. The lawngrass mat may be wound with or without a core. When using a core, it is usually a cylindrical core consisting of a metal or plastic material that is permeable. Its diameter, although varying with the length of the lawngrass mat, is preferably about 70 to 100 millimeters. The lawngrass mat may be rolled into any desirable size roll, for example, it may be provided as a roll with a width of 1 meter and a length of 100 meters.

The lawngrass mat can be readily transported and need only be unwound at the propagation site. The lawngrass mat is installed by laying the rolls on the ground and unwinding the rolls. Adjacent lawngrass mats may be overlapped. The mat may then be top dressed with soil and sprinkled with water. The lawngrass mat may be held down by the top dressing soil. However, when the lawngrass mat is laid on inclined ground, the mat is preferably anchored to the ground using pins as anchors. If desired, the lawngrass mat may be held by a perforated plastic film such as a mulching film during storage or transportation to the planting site.

The quantity of lawngrass sandwiched between the base net and cover varies according to the lawngrass, vegetation and desired period of propagation.

The netting of the present invention becomes unnecessary after the rooting of the lawngrass sprigs. Therefore, the biodegradable netting consists of a material that is capable of decaying and decomposing. Examples of suitable material for the netting are staple fiber and cotton fiber.

The mesh size of the netting must be small enough to keep the lawngrass sprigs dispersed on the netting, yet not interfere with the sprig rooting of the net and large enough to provide the necessary strength for the mat transplantation. The mesh size is usually about 9 to 18 millimeters.

DETAILED DESCRIPTION OF PREFERRED EMBODIMENTS

Figure 1:
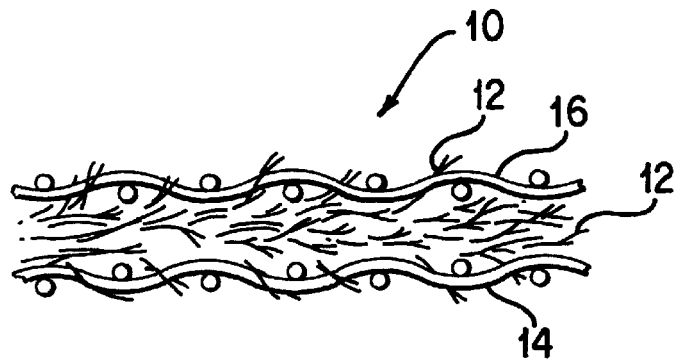
FIG. 1 is a sectional view showing a lawngrass transplantation mat including a first embodiment of the netting of the present invention.

Referring to the Figures, FIG. 1 is a sectional view illustrating the lawngrass transplantation mat 10 which includes base net 14 according to the present invention. Mat 10 is formed by lawngrass 12 sandwiched between base net 14 and cover 16. Base net 14 is on the ground side when the lawngrass mat 10 is laid on the ground.

Figure 4:
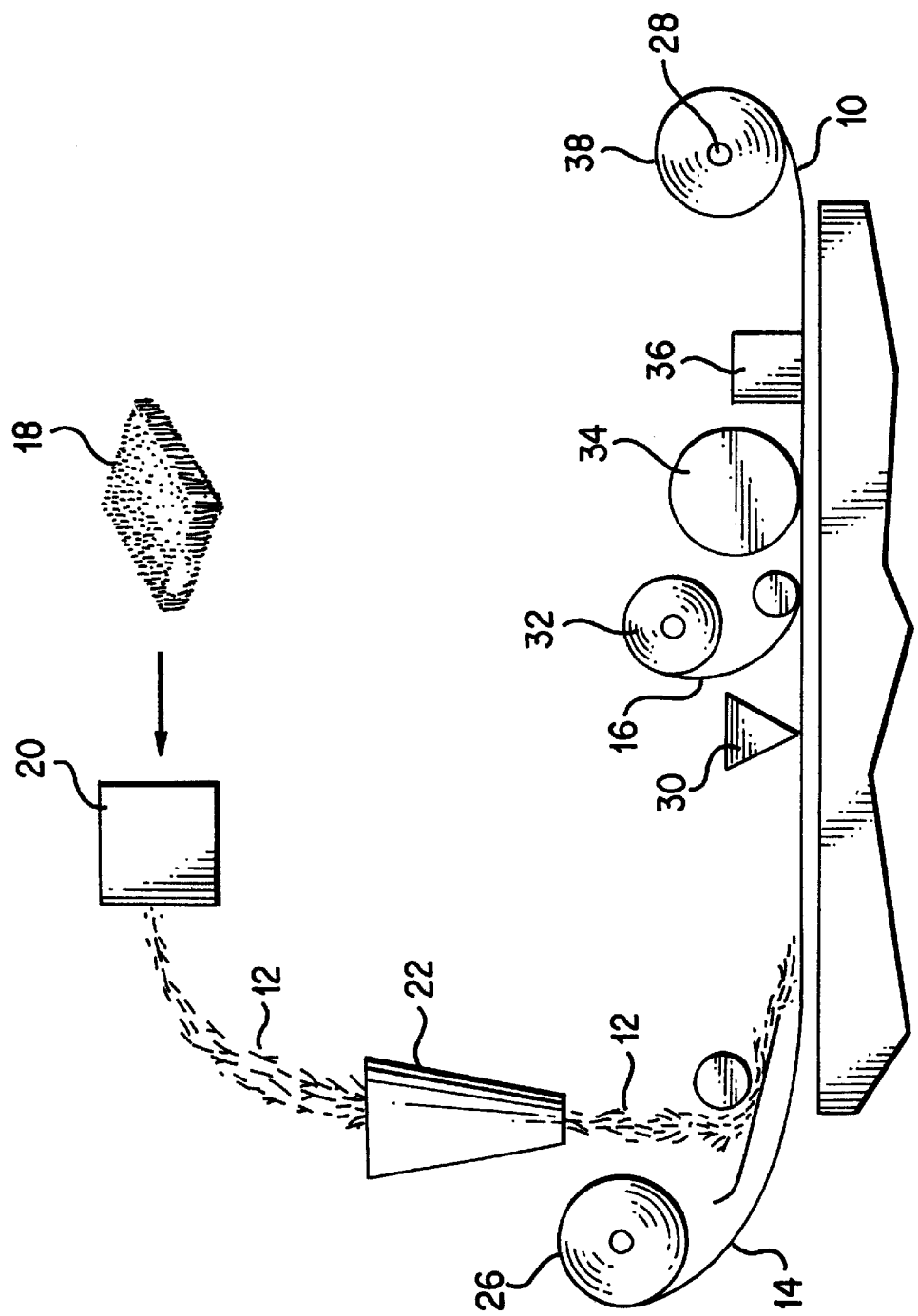
FIG. 4 illustrates a method of manufacturing a lawngrass transplantation mat which includes the netting according to the present invention.

A preferred method of manufacturing the lawngrass transplantation mat 10 is illustrated in FIG. 4. A sod square or rectangle 18 with dimensions 30 by 37 centimeters (in this embodiment) is cut from the source field and frayed out using a fraying machine 20 into lawngrass 12. Lawngrass 12 is inserted into a supply hopper 22. Underneath the supply hopper 22 is an inclined receptacle plate 24 for receiving the lawngrass 12 from the supply hopper 22. The lawngrass 12 falling onto the receptacle plate 24 is supplied by a feed roller 26 in adequate and desired quantities on a base net 14. The base net 14 is unwound off a roll which is supported by a suitable rewinder (not shown). The roll is on the left side in FIG. 4 and feeds base net 14 underneath the receptacle plate 24. The net 14 and lawngrass 12 then proceed under chemical supply unit 30, which dispenses chemicals such as a rooting accelerator, a vegetation accelerator, an anti-molding agent, a fungicide an insecticide, a fertilizer, etc. on net 14 and lawngrass 12 as desired.

After passing through these process steps, the cover 16 is placed over the lawngrass 12. As stated, cover 16 can be of the same netting as base net 14. A roller 32 unwinds cover 16. If the particular application requires it, the lawngrass mat 10 is pressed by a roller 34 after cover 16 is placed over lawngrass 12 and base net 14 and cover 16 are coupled together by a sewing unit 36.

The lawngrass mat 10 is then rolled into roll 38 on the right side of FIG. 4, on core 28.

Figure 2:
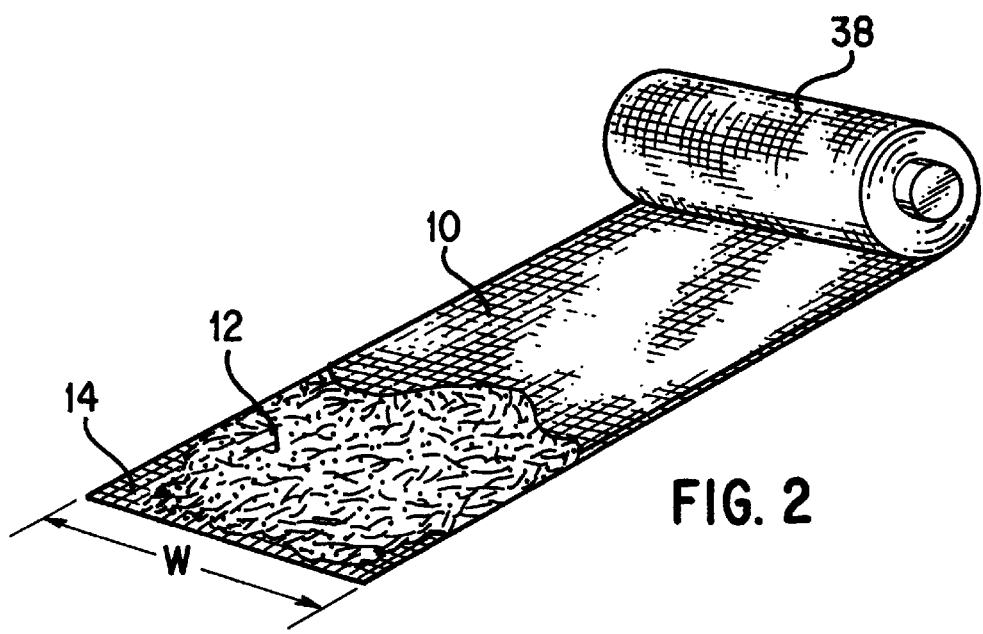
FIG. 2 is a perspective view, partly broken away, showing the lawngrass transplantation mat of FIG. 1.

FIG. 2 is a fragmentary perspective view showing the lawngrass transplantation mat 10 manufactured as a roll 38 by the method described above.

The roll 38 is of a suitable size, for instance having a diameter of 30 to 50 centimeters, a width of 1 meter and a length (unrolled) of 50 meters.

Figure 5A:
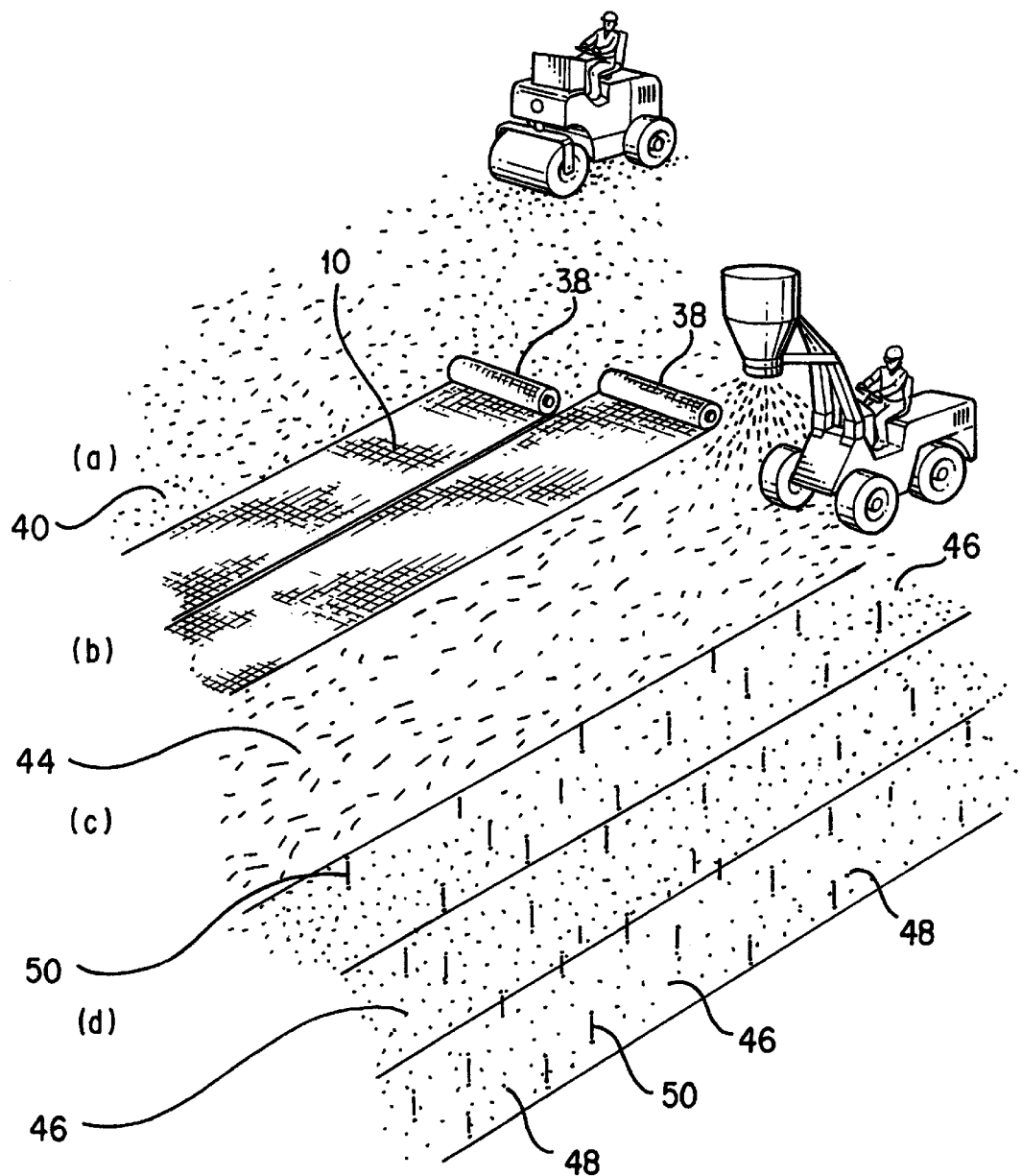
FIGS. 5A and 5B illustrate a method of laying the lawngrass mat including the netting of the present invention.
Figure 5B:
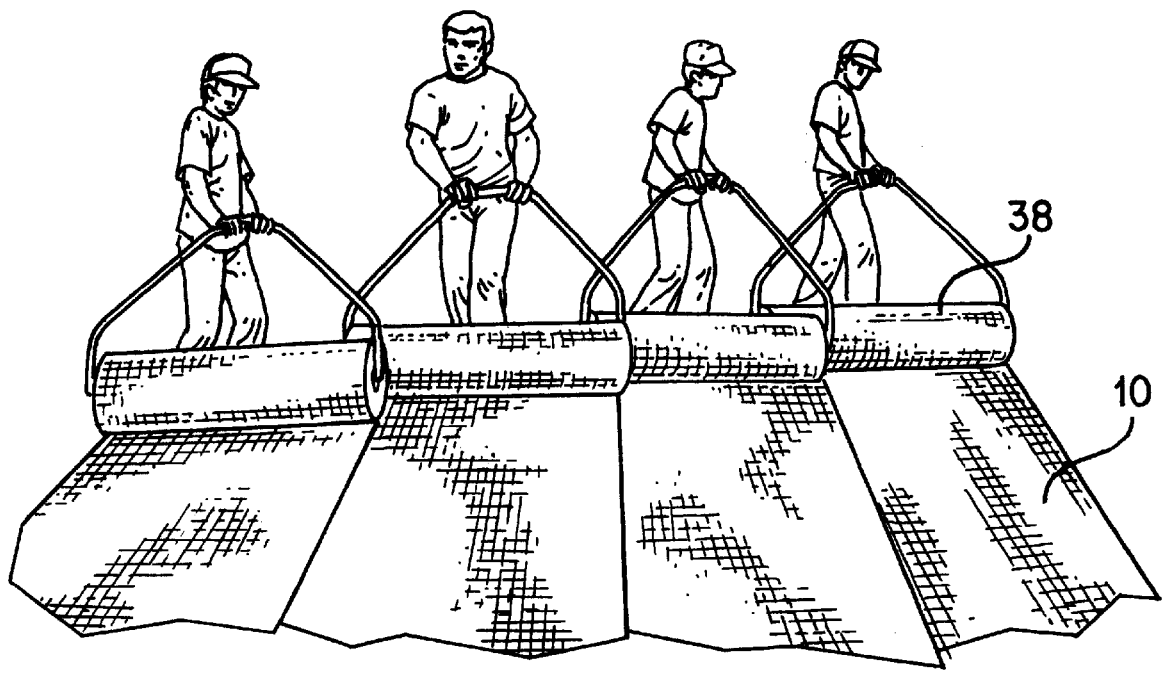

FIGS. 5A and 5B illustrate one method of laying rolls 38 on ground surface 40. The ground surface 40 is first rolled at (a) and then the rolls 38 are laid at (b) by unrolling the rolls. FIG. 5B shows the rolls 38 being unrolled. Adjacent lawngrass mats 10 may be overlapped if desired, preferably at least 5 centimeters at each edge 42. If ground surface 40 is an inclined surface, the lawngrass mat 10 is preferably laid in a direction perpendicular to the contour lines.

It is preferable to lay the lawngrass mat 10 while spraying water that contains a root accelerator. Lastly, conventional cover soil 44 is applied at (c) to the top of mat 10. The cover soil 44 is preferably provided to a thickness of about 5 to 10 millimeters. The grain size of the soil is preferably as small as possible. It is possible, if desired, to add an aquagrow agent and fertilizer to the soil, knead the mixture with water and to blow out the resultant paste using a seeder. The cover soil 44 may be heat-treated to remove seeds or harmful insect eggs. Alternatively, it is possible to use a mixture of heated soil and peat moss.

Figure 3:
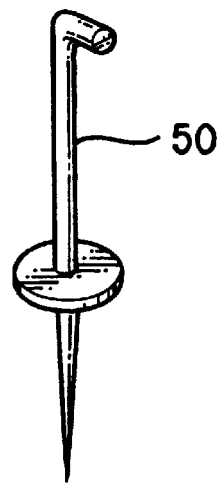
FIG. 3 is a perspective view of an anchor which may be employed with the mat of FIGS. 1 and 2.

At (d) in FIG. 5A a mulch step is shown in which the cover soil 44 is covered by a perforated plastic mulching film 46. In this embodiment, the perforated plastic film 46 has a width of 120 centimeters and a large number of holes 48. Holes 48 may be approximately 10 millimeters in diameter and arranged at a pitch of 10 centimeters into columns and rows. After placing the film 46 on the cover soil 44, it may be secured in position by anchors 50 (as shown in FIG. 3). The molding film 46 may be left in place for a predetermined period of time (e.g. 20 to 90 days) to preserve moisture and temperature for growth and until budding is done. When the lawngrass has grown, the film 46 is removed by taking out the anchors 50. The film 46 may be reused.

As described above, conventional lawngrass transplantation processes produce gaps between the sod sprigs, plugs or strips and, therefore, require a considerable time before uniform mature lawngrass is obtained. No such gaps are formed using lawngrass mats 10 including base net 14 of the present invention, and therefore uniform growth of lawngrass is obtained from the outset.

Further, using base net 14 of the present invention, lawngrass is sandwiched in a suitable quantity and is sufficiently dispersed between base net 10 and cover 16 to provide excellent growth in all areas for vegetation. Strong and dense lawngrass can thus be quickly obtained.

Further, since the roll 38 is not very bulky, it is conveniently transported and carried to the site, and transportation costs are greatly reduced. For example, a person can carry two rolls 38 on his or her shoulders. Two rolls correspond to a lawngrass area of 120 square meters. By comparison, a 2-ton truck is required to transport an equal amount of turfed lawngrass sod.

As a further example, eight large trucks having a capacity of 11 tons each are required to transport the amount of sod that equals the amount of lawngrass, comprising lawngrass rolls 38 of the present invention, carried by a single middle size truck having a capacity of 4 tons.

Moreover, the use of base net 14 minimizes lawngrass and soil or sand erosion. Additionally, a couple of months after the lawngrass mat 10 has been installed, the net 14 decays and does not interfere with the use of the lawngrass.

Figure 12:
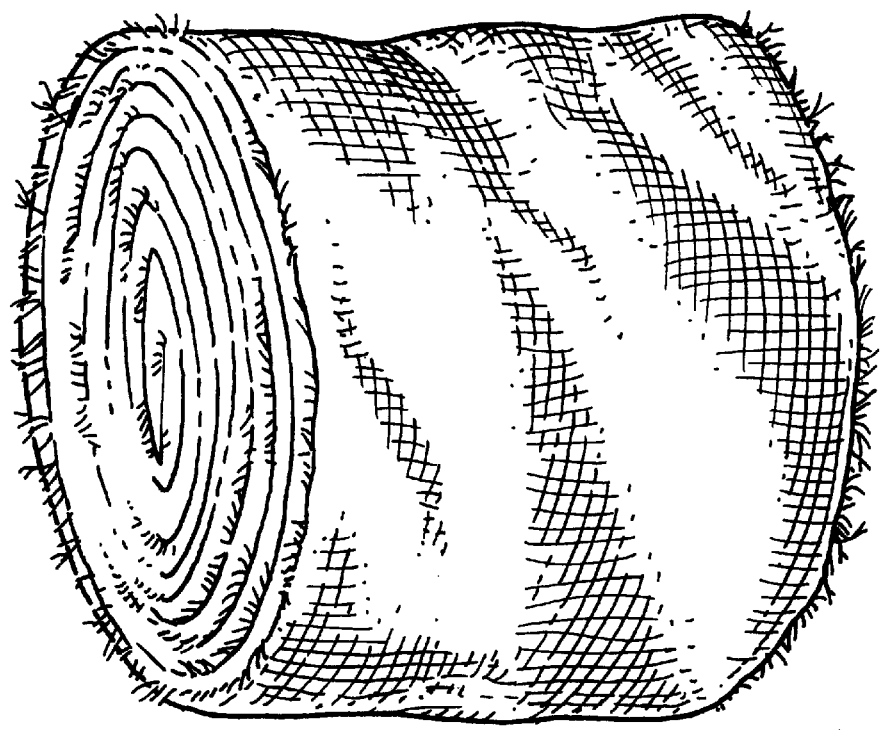
FIG. 12 shows the biodegradable netting of this invention on big roll sod.

As stated, the lawngrass netting of the present invention may also be used as a backing for big roll sod as shown in FIG. 12. Big roll sod is formed by cutting lawngrass into an elongated strips and rolling the strips into big rolls. The backing is used to maintain the integrity of the sod strips. This is important because, without a backing, the lawngrass sod strips tend to break apart. The big roll sod is transported and installed by unrolling the lawngrass along with its backing onto the transplantation site. The lawngrass netting of the present invention decomposes and does not interfere with the use of the lawngrass once it is sufficiently established.

Figure 6:
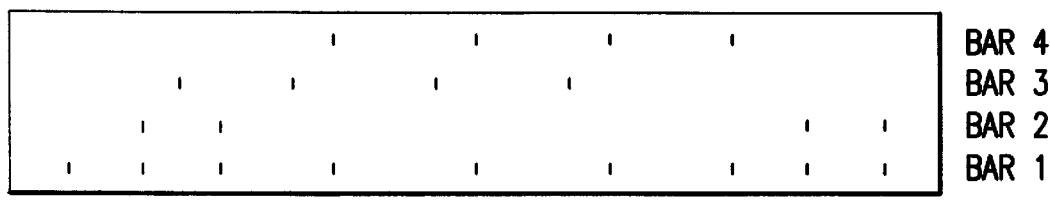
FIG. 6 is a thread chart of the knit pattern of the present invention.

Referring to FIG. 6, a thread chart shows the location of needles in the four bar knitting process of the net of the present invention. The net is preferably a Raschel knit bar net as schematically described in FIGS. 7–11 but the net could be made on a tricot knitting machine if desired.

Figure 7:
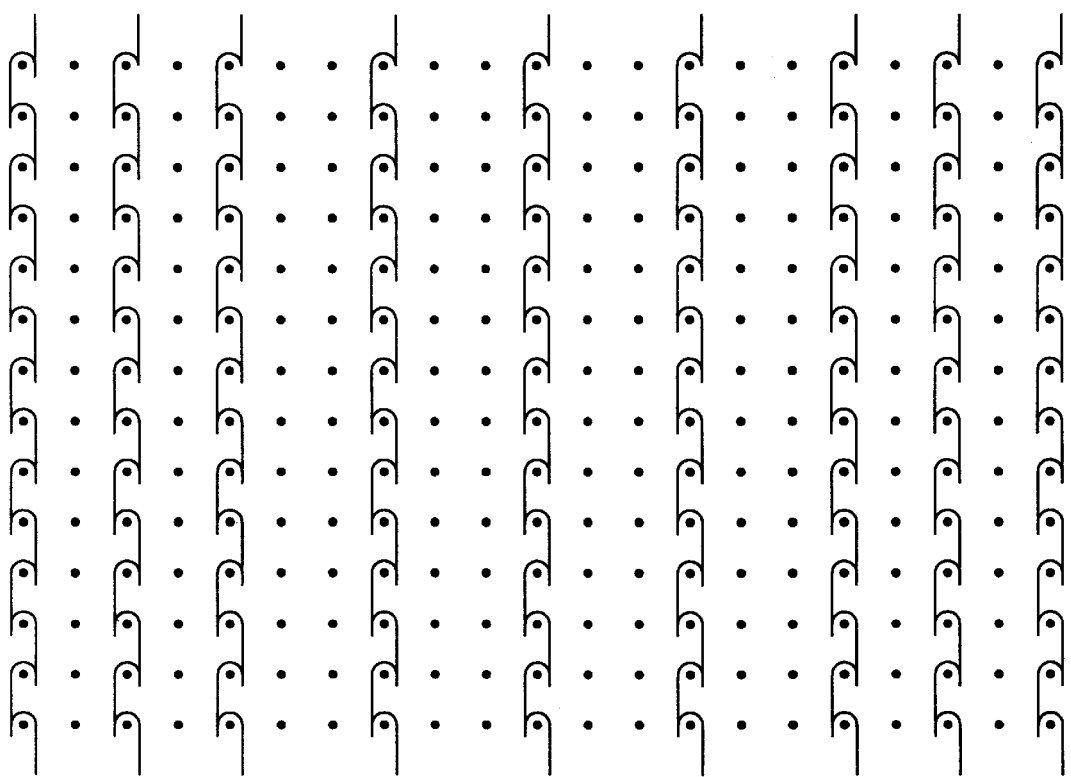
FIGS. 7–10 are diagrams of the knitting machine bar movements to knit the netting of the present invention.
Figure 8:
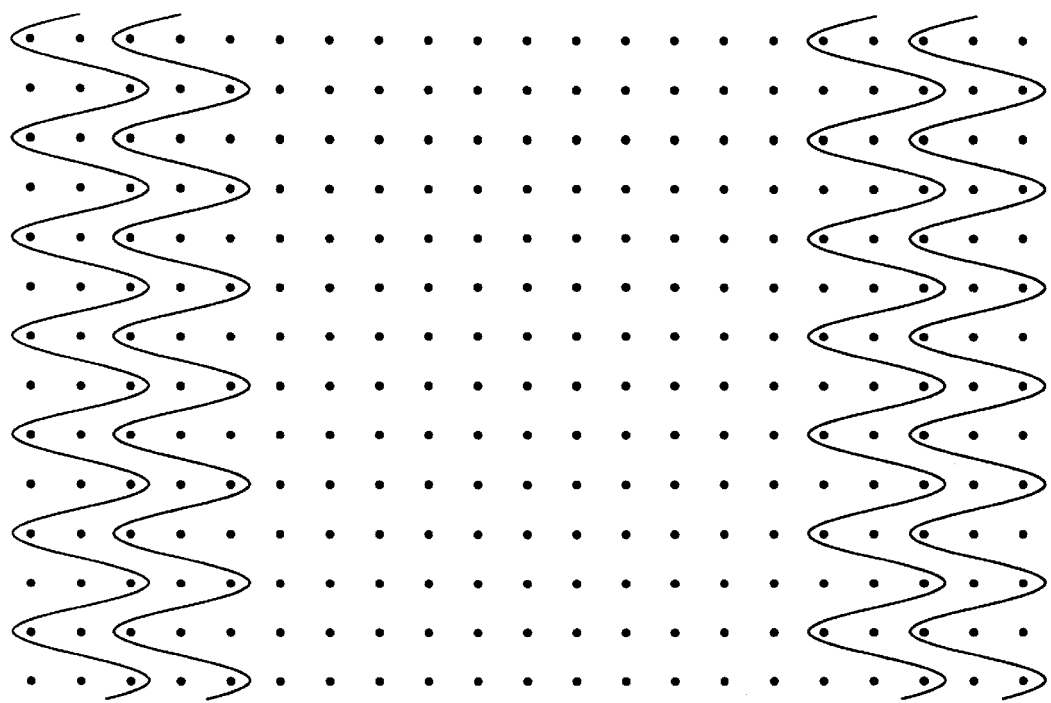
Figure 9:
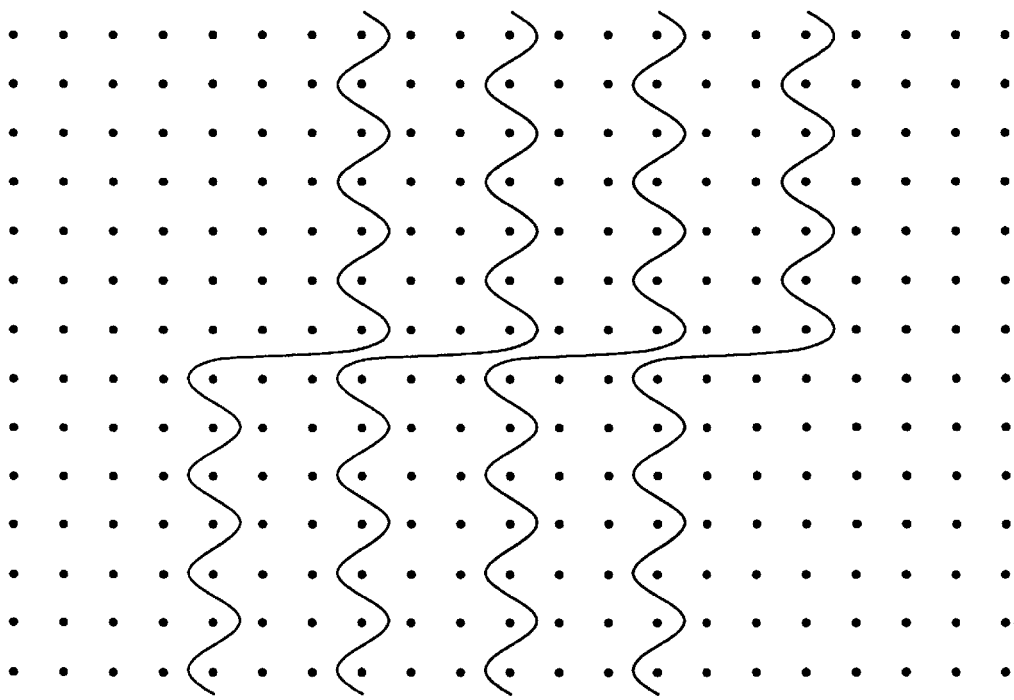
Figure 10:
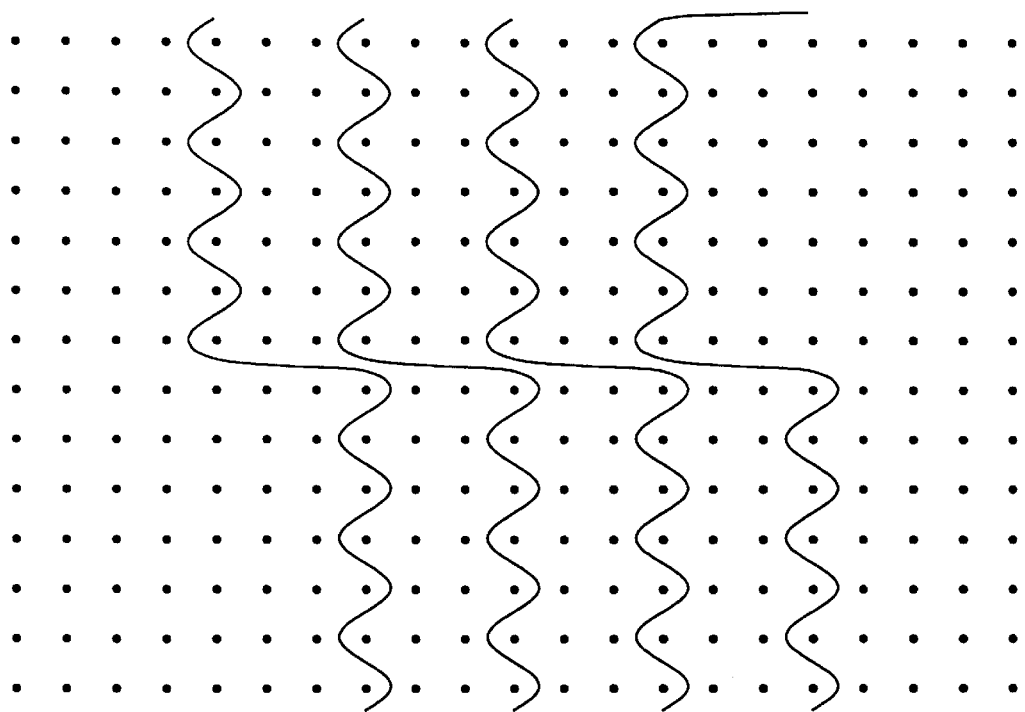
Figure 11:
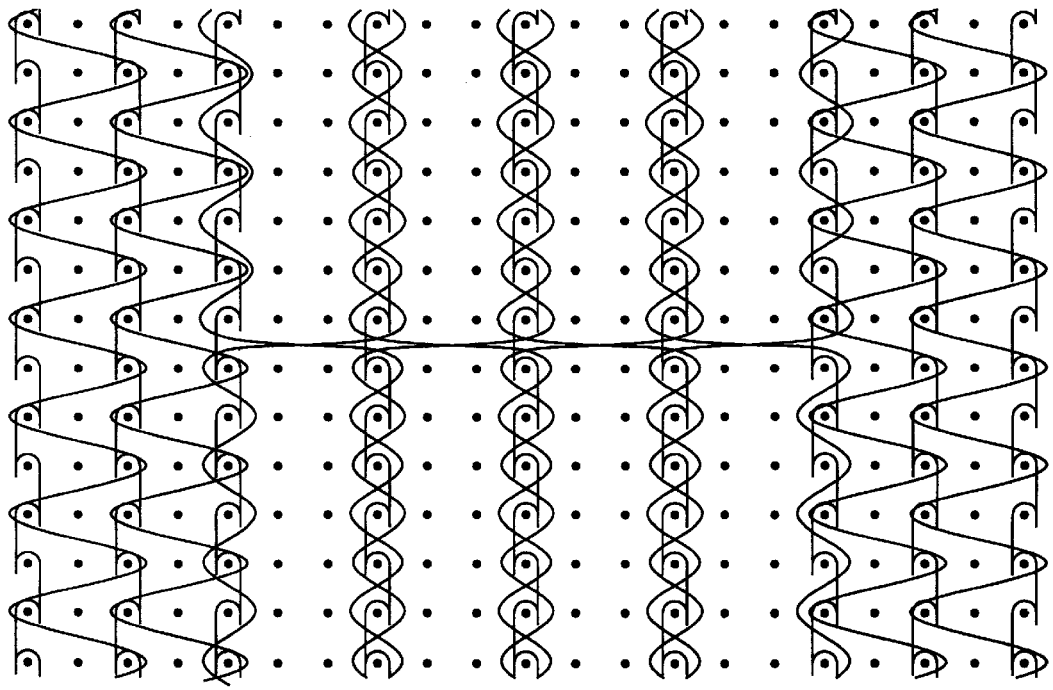
FIG. 11 is a diagram of combined bar movements to knit the netting of the present invention.

As shown in FIG. 7, bar 1 has a movement of 0-8, 8-0, etc. Looking now at FIG. 8, it can be seen that the yarn on bar 2 has a movement of 0-0, 24-24, etc. FIG. 9 shows the movement of bar 3 of 32-32, 24-24, 32-32, 24-24, 32-32, 24-24, 32-32, 0-0, 8-8, 0-0, 8-8, 0-0, 8-8, and 0-0. Lastly, FIG. 10 shows the bar 3 movement as 0-0, 8-8, 0-0, 8-8, 0-0, 8-8, 0-0, 32-32, 24-24, 32-32, 24-24, 32-32, 24-24, and 32-32. FIG. 11 shows a diagram of the combined bar movements of the knit fabric for the net.

The knit pattern of the net of the present invention is shown in Table I as well as FIG. 11. By the net pattern of the present invention, the amount of material required to produce the net is significantly reduced. The present invention cuts down on material costs and also minimizes the amount of material left to decompose after the lawngrass mat is installed.

TABLE I

| Bar 1 | Bar 2 | Bar 3 | | | | Bar 4 | | | |
|---|---|---|---|---|---|---|---|---|---|
| 0 | 0 | 32 | 32 | 8 | 8 | 0 | 0 | 24 | 24 |
| 8 | 0 | 32 | 32 | 8 | 8 | 0 | 0 | 24 | 24 |
| 8 | 24 | 24 | 24 | 0 | 0 | 8 | 8 | 32 | 32 |
| 8 | 24 | <u>24</u> | <u>24</u> | <u>0</u> | <u>0</u> | <u>8</u> | <u>8</u> | <u>32</u> | <u>32</u> |
| | | 32 | 32 | 8 | | 0 | 0 | 24 | |
| | | 32 | 32 | 8 | | 0 | 0 | 24 | |
| ↓ | ↓ | 24 | 0 | 0 | | 8 | 32 | 32 | |
| | | 24↗ | 0↗ | 0↗ | | 8↗ | 32↗ | 32↗ | |

Although this invention has been described by the specific embodiments outlined above, many alternatives, modifications and variations are apparent to those skilled in the art. Accordingly, the preferred embodiments described above are illustrative and not limiting. Various changes may be made without departing from the spirit and scope of the invention as defined in the following claims.

What is claimed is:

1. A biodegradable lawngrass netting for use in a transplantation mat comprising vegetative grass sprigs sandwiched between a net and a cover member, wherein the design of the net is represented by:

a repeating first bar movement of 0-8, 8-0;

a repeating second bar movement of 0-0, 24-24;

a third bar with a movement of 32-32, 24-24, 32-32, 24-24, 32-32, 24-24, 32-32, 0-0, 8-8, 0-0, 8-8, 0-0, 8-8, and 0-0; and a fourth bar with a movement of 0-0, 8-8, 0-0, 8-8, 0-0, 8-8, 0-0, 32-32, 24-24, 32-32, 24-24, 32-32, 24-24 and 32-32.

2. A method of knitting a biodegradable net for a lawngrass transplantation mat comprising the step of forming a net with a design represented by:

a repeating first bar movement of 0-8, 8-0;

a repeating second bar movement of 0-0, 24-24;

a third bar with a movement of 32-32, 24-24, 32-32, 24-24, 32-32, 24-24, 32-32, 0-0, 8-8, 0-0, 8-8, 0-0, 8-8, and 0-0; and a fourth bar with a movement of 0-0, 8-8, 0-0, 8-8, 0-0, 8-8, 0-0, 32-32, 24-24, 32-32, 24-24, 32-32, 24-24 and 32-32.

3. A biodegradable lawngrass netting for use as a backing for big roll sod, wherein the design of the net is produced by a process comprising the steps of:

a repeating first bar movement of 0-8, 8-0;

a repeating second bar movement of 0-0, 24-24;

a third bar with a movement of 32-32, 24-24, 32-32, 24-24, 32-32, 24-24, 32-32, 0-0, 8-8, 0-0, 8-8, 0-0, 8-8, and 0-0; and a fourth bar with a movement of 0-0, 8-8, 0-0, 8-8, 0-0, 8-8, 0-0, 32-32, 24-24, 32-32, 24-24, 32-32, 24-24 and 32-32.

4. A method of knitting a biodegradable net for a backing in big roll sod comprising the step of forming a net with a design produced by a process comprising the steps of:

a repeating first bar movement of 0-8, 8-0;

a repeating second bar movement of 0-0, 24-24;

a third bar with a movement of 32-32, 24-24, 32-32, 24-24, 32-32, 24-24, 32-32, 0-0, 8-8, 0-0, 8-8, 0-0, 8-8, and 0-0; and a fourth bar with a movement of 0-0, 8-8, 0-0, 8-8, 0-0, 8-8, 0-0, 32-32, 24-24, 32-32, 24-24, 32-32, 24-24 and 32-32.

* * * * *